(12) United States Patent
Whitmore

(10) Patent No.: US 9,771,119 B2
(45) Date of Patent: Sep. 26, 2017

(54) STRESSED FORK MOTORCYCLE REVERSE TRIKE CONVERSION APPARATUS

(71) Applicant: Darrell Jay Whitmore, Elgin, IL (US)

(72) Inventor: Darrell Jay Whitmore, Elgin, IL (US)

( * ) Notice: Subject to any disclaimer, the term of this patent is extended or adjusted under 35 U.S.C. 154(b) by 0 days.

(21) Appl. No.: 15/218,255

(22) Filed: Jul. 25, 2016

(65) Prior Publication Data

US 2017/0021891 A1   Jan. 26, 2017

Related U.S. Application Data

(60) Provisional application No. 62/195,909, filed on Jul. 23, 2015.

(51) Int. Cl.
| | |
|---|---|
| *B62K 13/04* | (2006.01) |
| *B62K 13/08* | (2006.01) |
| *B62K 5/05* | (2013.01) |
| *B62K 5/00* | (2013.01) |

(52) U.S. Cl.
CPC ............. *B62K 13/04* (2013.01); *B62K 5/05* (2013.01); *B62K 13/08* (2013.01); *B62K 2005/001* (2013.01)

(58) Field of Classification Search
CPC .................................. B62K 5/05; B62K 13/04
See application file for complete search history.

(56) References Cited

U.S. PATENT DOCUMENTS

| | | | | |
|---|---|---|---|---|
| 4,469,344 | A  * | 9/1984 | Coil .......................... | B62K 5/05 280/269 |
| 5,236,060 | A  * | 8/1993 | Huber ................... | B62D 61/065 180/210 |
| 7,591,337 | B2 | 9/2009 | Suhre et al. | |
| 9,387,902 | B2 * | 7/2016 | Kroening, Jr. ......... | B62K 13/04 |
| 2006/0273544 | A1* | 12/2006 | Donovan ................. | B62K 5/05 280/282 |
| 2013/0186701 | A1 | 7/2013 | Bedard et al. | |
| 2016/0023709 | A1* | 1/2016 | Kokes .................... | B62K 13/04 280/269 |

* cited by examiner

*Primary Examiner* — Kevin Hurley
(74) *Attorney, Agent, or Firm* — Dunlap Bennett & Ludwig PLLC

(57) ABSTRACT

A reverse trike attachment is provided. The reverse trike attachment includes a motorcycle connector frame operable to secure to a front end of a motorcycle frame. A rotating fork joint is secured to and is rotatable relative to the motorcycle connector frame. The rotating fork joint is operable to secure to a motorcycle fork. A wheel assembly includes a first and second wheel mount spindle secured to opposing sides of the motorcycle connector frame. A first wheel is pivotally secured to the first wheel spindle and a second wheel is pivotally secured to the second wheel mount spindle. The first and second wheels each pivot about a vertical axis. The first ends of a first and second tie rod are secured to the rotating fork joint and the second ends of the first and second tie rods are secured to the first and second wheel spindle respectively.

14 Claims, 4 Drawing Sheets

1

STRESSED FORK MOTORCYCLE REVERSE TRIKE CONVERSION APPARATUS

CROSS-REFERENCE TO RELATED APPLICATION

This application claims the benefit of priority of U.S. provisional application No. 62/195,909, filed Jul. 23, 2015, the contents of which are herein incorporated by reference.

BACKGROUND OF THE INVENTION

The present invention relates to reverse trikes and, more particularly, to a reverse trike conversion apparatus.

Three-wheeled motorcycles or "trikes" having two rear wheels and a single front wheel are well known in the art. Trikes combine many of the best features of a traditional motorcycle with those of a four-wheeled vehicle in a way that produces highly advantageous results. First, the overall size of the reverse-trike makes it more visible than a conventional motorcycle, thus increasing rider safety. Second, the extra third wheel offers stability by making it easier to balance, drive, and steer. Third, it has more storage and cargo space than a traditional motorcycle. Finally, it is simply fun to drive and often results in admiring stares and questions from others. While trikes are fairly prevalent, they are usually custom made and therefore are typically much more expensive than conventional two-wheeled motorcycles.

A variation of the traditional trike motorcycle has recently been introduced which is referred to in the industry as a "reverse-trike" in that it has two front wheels and one rear wheel. Reverse trikes are visually striking and offer the benefits of the traditional trike. In addition, reverse trikes handle more like a conventional two-wheeled motorcycle and therefore many riders prefer reverse-trikes over the traditional trikes. Reverse trikes, like traditional trikes are usually custom made, but recently some original equipment manufacturers (OEM's) have started producing reverse trikes.

Whether custom made or produced by an OEM, reverse-trikes are considerably more expensive than conventional motorcycles. The cost was often so high that consumers were forced to choose a conventional two-wheeled motorcycle over the more-desired but more expensive reverse-trike.

As can be seen, there is a need for a relatively low cost means to convert a conventional two-wheeled motorcycle into a three-wheeled reverse-trike.

SUMMARY OF THE INVENTION

In one aspect of the present invention, a reverse trike attachment comprises: a motorcycle connector frame comprising a proximal end operable to secure to a front end of a motorcycle body; a rotating fork joint secured to the motorcycle connector frame and rotatable relative to the motorcycle connector frame about a vertical axis, wherein the rotating fork joint is operable to secure to a motorcycle fork; a wheel assembly comprising: a first wheel mount bracket and a second wheel mount bracket secured to opposing sides of the motorcycle connector frame; a first wheel pivotally secured to the first wheel mount bracket and a second wheel pivotally secured to the second wheel mount bracket, wherein the first wheel and the second wheel pivot about a vertical axis; and a first tie rod comprising a first end secured to the rotating fork joint and a second end secured to the first wheel; and a second tie rod comprising a first end secured to the rotating for joint and a second end secured to the second wheel.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a motorcycle stressed fork reverse trike attachment that is designed to retain the fork of a motorcycle for direct steering and cycle support. Dual radius geometry, a heavy duty thrust bearing and fabricated U joint allow the steering mechanism to match the radius of gyration of the fork-axle center. This allows the steering conversion system to support the weight of motorcycle (stressed fork). The present invention allows reverse trike conversion without design modification of a motorcycle frame, steering and or suspension design. To install the present invention, remove the front wheel/brakes/fender and install the conversion. The motorcycle is not modified in any way and can be returned to original form by reassembly.

The "stressed fork reverse trike conversion" invention comprises of following:

1) Motorcycle support/steering module that includes rotary steering plate, fabricated universal joint connecting motorcycle fork/axle to steering plate, thrust bearing, flange bearing, steering rotation shaft and sub-frame/mounting plates. Tie rod connection to Steering Plate interfaces to conventional automotive steering spindle supported by A-arms with connection to Stressed Fork frame rails. The universal joint and offset radius allow the motorcycle to steer using handlebar and fork rotation without imposing lateral force on the Stressed Fork Conversion frame rails.

2) Trailing links connecting to motorcycle frame mount/shaft to Stressed Fork Conversion frame rails. The trailing links allow for normal travel of the motorcycle fork allowing the Stressed Fork Conversion frame rails to move on a horizontal plane.

Figure 1:
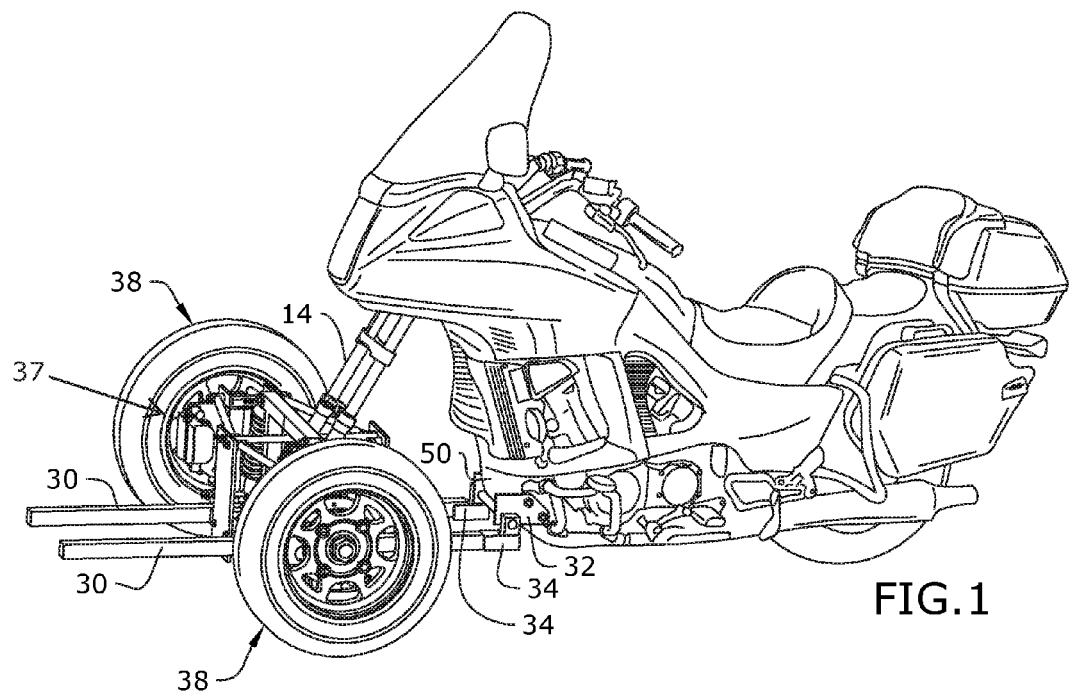
FIG. 1 is a perspective view of an embodiment of the present invention in use.
Figure 2:
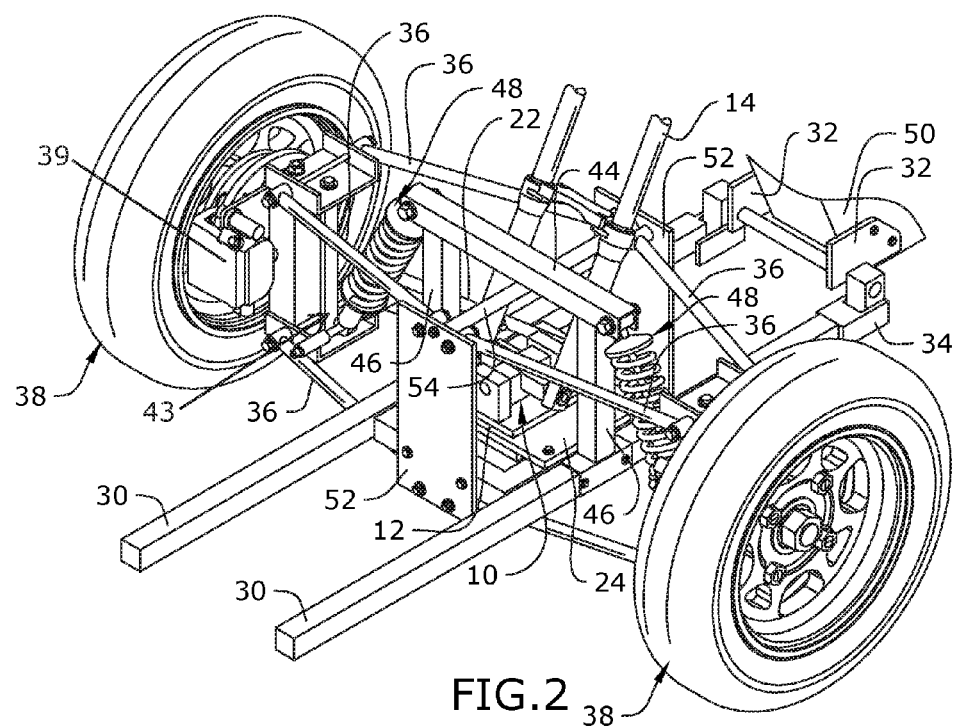
FIG. 2 is a front perspective detail view of an embodiment of the present invention without the wheels turned.
Figure 3:
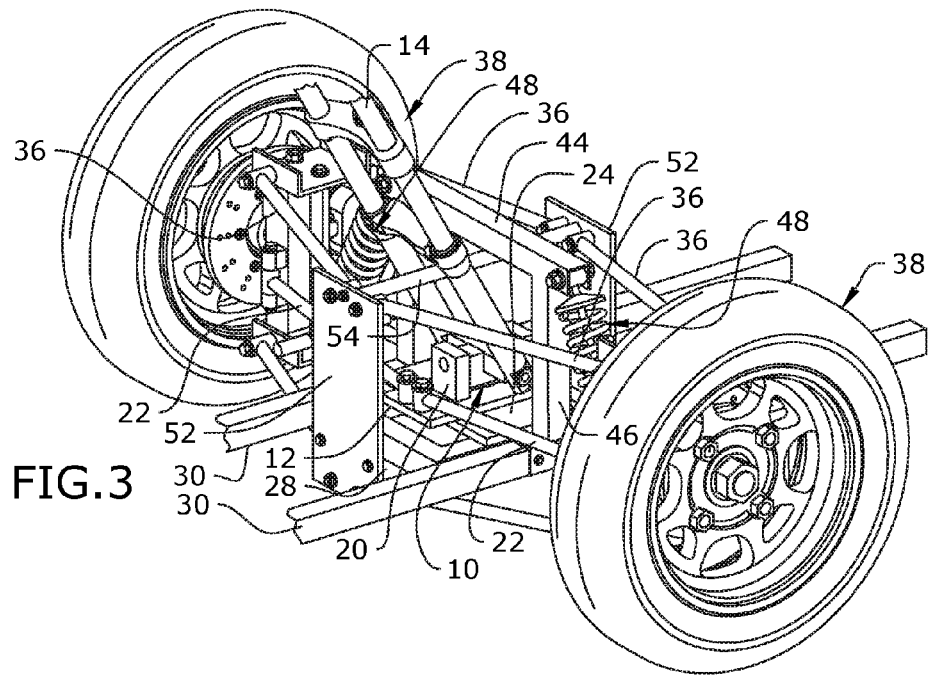
FIG. 3 is a rear perspective detail view of an embodiment of the present invention without the wheels turned.
Figure 4:
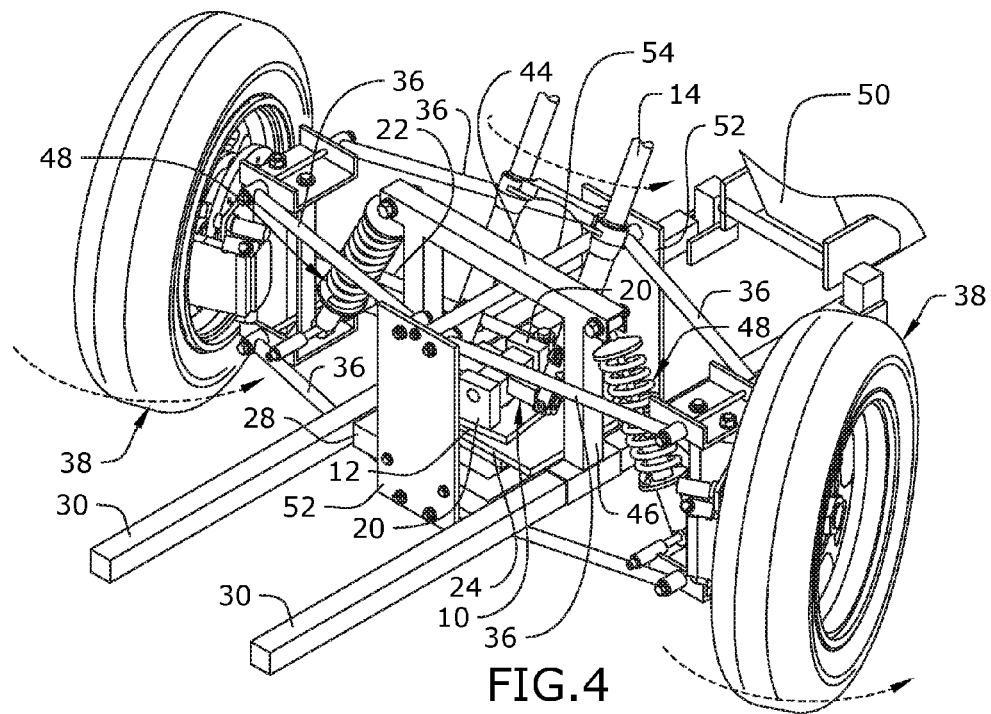
FIG. 4 is a front perspective detail view of an embodiment of the present invention with the wheels turned.
Figure 5:
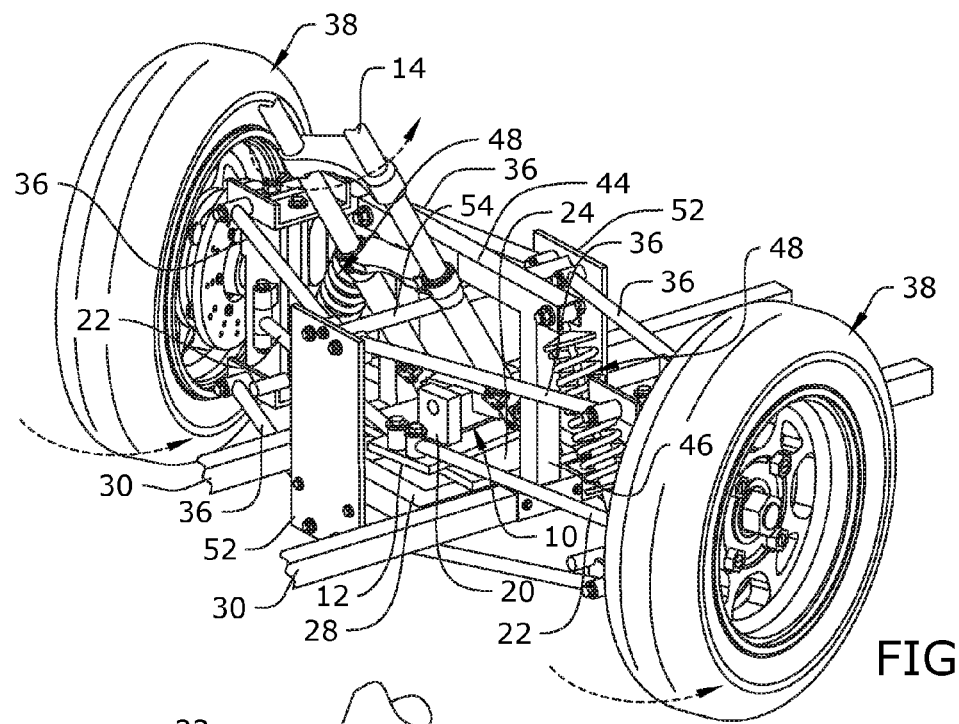
FIG. 5 is a rear perspective detail view of an embodiment of the present invention with the wheels turned.
Figure 6:
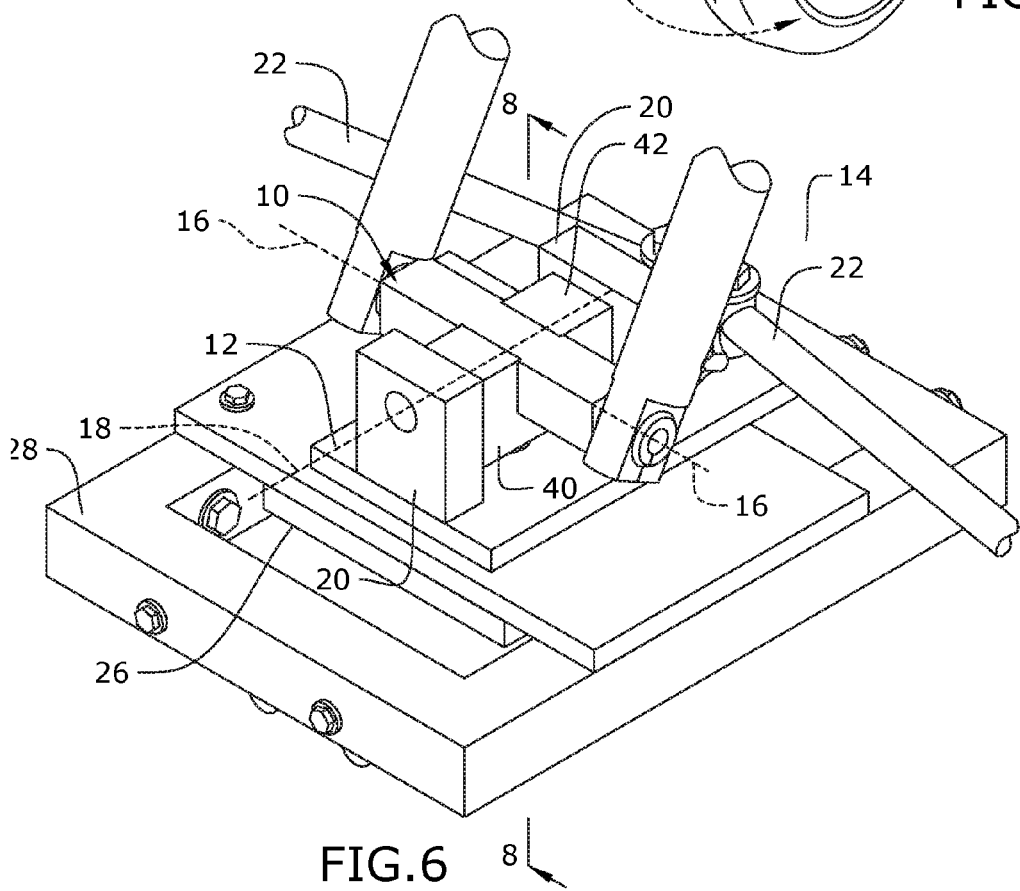
FIG. 6 is a detail perspective view of the rotating fork joint of an embodiment of the present invention.
Figure 7:
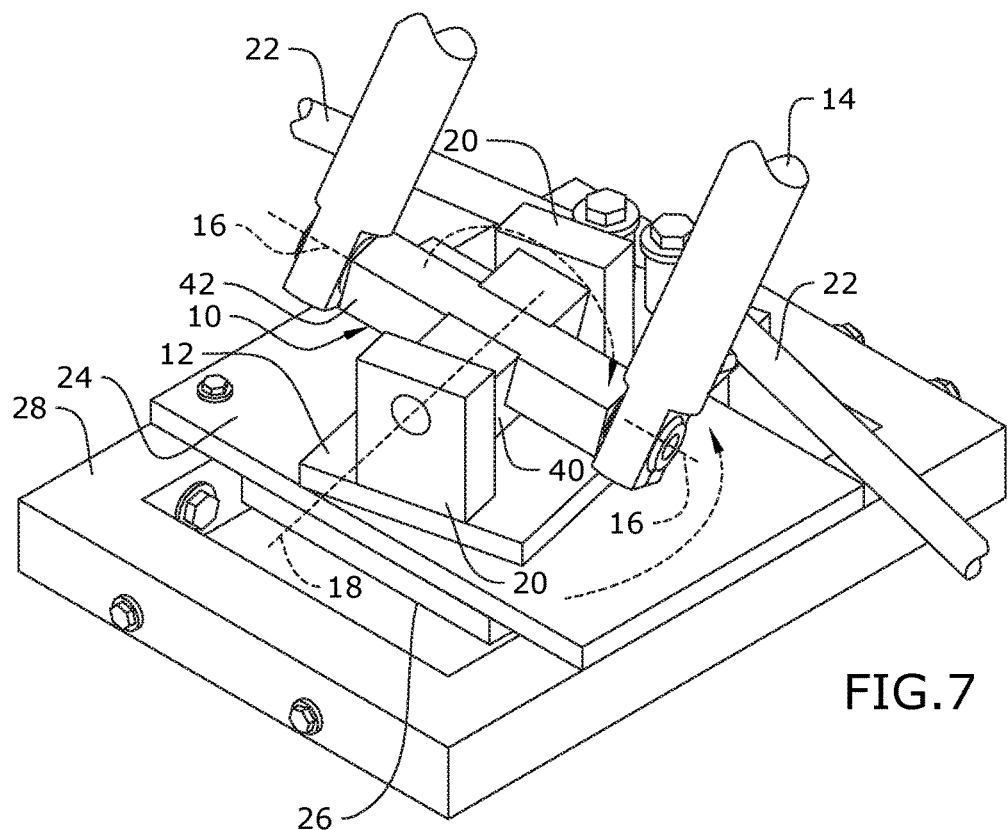
FIG. 7 is a detail perspective view of the rotating fork joint of an embodiment of the present invention.
Figure 8:
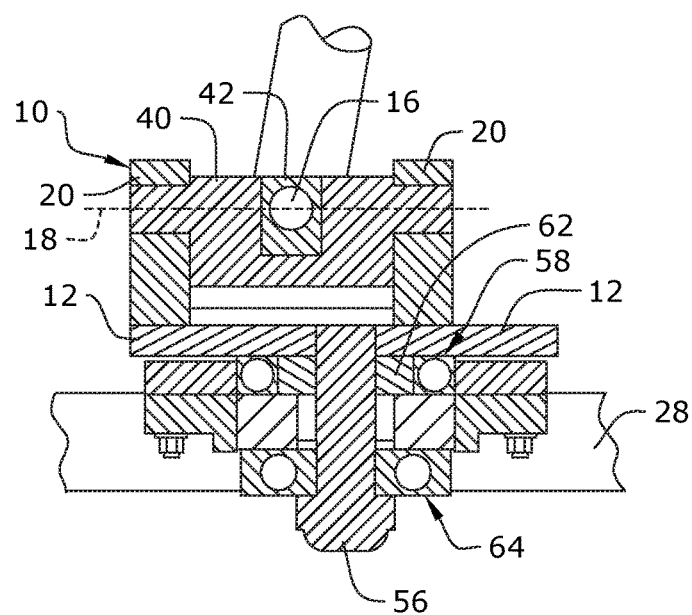
FIG. 8 is a section detail view taken along line 8-8 in FIG. 6.

Referring to FIGS. 1 though 8, the present invention includes reverse trike attachment. The reverse trike attachment includes a motorcycle connector frame 30 having a proximal end operable to secure to a front end of a motorcycle frame 50. A rotating fork joint 10 is secured to the motorcycle connector frame 30 and is rotatable relative to the motorcycle connector frame 30 about a vertical axis. The rotating fork joint 10 is operable to secure to a motorcycle fork 14. The present invention further includes a wheel assembly 37. The wheel assembly includes a first and second wheel mount bracket 39 secured to opposing sides of the motorcycle connector frame 30. A first wheel 38 is pivotally secured to the first wheel mount bracket 39 and a second wheel 38 is pivotally secured to the second wheel mount bracket 39. The first and second wheels 38 each pivot about a vertical axis. Application of the present invention further includes a first and second tie rod 22. The first ends of the first and second tie rods 22 are secured to the rotating fork joint 10 and the second ends of the first and second tie rods 22 are secured to the first and second wheels 38 respectively.

The motorcycle connector frame 30 may include a pair of elongated beams substantially parallel with each other. A fork joint frame 28 may connect the pair of elongated beams together. The fork joint frame 28 may be square or rectangular shape. The motorcycle connector frame 30 may secure to the front end of a motorcycle frame 50 so that the pair of elongated beams are capable of moving away from and moving towards the motorcycle frame along a horizontal plane. In such embodiments, each of the elongated beams may include a pair of plates 34 secured to the proximal end and forming a space in between. A pivoting block 33 may include a top end and a bottom end. The bottom end may be pivotally secured within the space in between the pair of plates 34. The top end may extend vertically from the pair of plates and may be pivotally secured to a mounting bracket 32 by a pivot bar 35. The mounting brackets 32 are bolted to the motorcycle frame 50. The pivoting block 33 may pivot along a horizontal axis in between the pair of plates 34 and along a horizontal axis of the pivot bar 35 allowing the motorcycle connector frame 30 to slightly move forward and backward relative to the motorcycle frame 50. The pivoting block 33 may be large enough to abut against the end of the elongated beam after a certain degree of pivoting, thereby preventing the pivoting block 33 from pivoting beyond about 45 degrees in both directions.

In certain embodiments, the present invention may include support plates 52 to add support to the overall frame. The support plates 52 may be secured to a front end and a rear end of the fork joint frame 28 and may extend vertically therefrom. A connector bar 54 may connect the support plates 52 together at a top end. A plurality of stabilizing bars 36 may be secured to the support plates 52 at a first end and secured to the wheel mount brackets 39 at a second end, thereby providing additional support and stability to the wheel mount brackets 39 and the motorcycle connector frame 30.

Application of the present invention may further includes suspension assembly 43. The suspension assembly 43 may be formed of vertical support bars 46 extending from the motorcycle connector frame 30. A horizontal upper bar 44 may connected the top ends of the vertical support bars 46 together. The suspension assembly further includes a pair of shocks 48. A top end of each of the shocks 48 may be secured to the horizontal upper bar 44 and a bottom end of each of the shocks 48 may be secured to the wheel mount brackets 39 respectively.

The rotating fork joint 10 may include a mount plate 24 secured to the fork joint frame 28. A bearing plate 26 may be secured below the mount plate 24. The bearing plate 26 may include a thrust bearing 58 and a flange bearing 64 and a bearing spacer ring 62 disposed within the thrust bearing 58. The rotating shaft 56 may run through the flange bearing 62, the bearing spacer ring 62 and the mount plate 24. A rotating plate 12 may be fixed to the rotating shaft 56 and may thereby rotate about a vertical axis relative to the mount plate 24. A U-joint 20 extends from an upper surface of the rotating plate 12. A cross joint may be secured within the U-joint 20. The cross joint includes a first block 42. The motorcycle fork 14 may secure to opposing ends of the first block 42. A second block 40 is secured and is substantially perpendicular to the first block 42, forming a cross shape. The second block 40 is rotatably connected to the U-joint 20 and rotates about a horizontal axis 18. First ends of the tie rods 22 are secured to the rotating plate 12 and the second ends of the tie rods 22 are secured to the steering arms of the wheels 38. When a user rotates the motorcycle fork 14, the rotating plate 12 rotates causing the tie rods 22 to push and pull on the wheels 38, which pivots the wheels 38 and turns the motorcycle.

It should be understood, of course, that the foregoing relates to exemplary embodiments and application of the invention and that modifications may be made without departing from the spirit and scope of the invention as set forth in the following claims.

What is claimed is:

1. A reverse trike attachment comprising:
    a motorcycle connector frame comprising a proximal end operable to secure to a front end of a motorcycle frame;
    a rotating fork joint secured to the motorcycle connector frame and comprising a first block horizontally disposed, having a first end opposite a second end and rotatable relative to the motorcycle connector frame about a vertical axis, wherein a motorcycle fork of a motorcycle is operable to secure to the first end and the second end of the first block, thereby connecting the reverse trike attachment to the motorcycle and supporting a weight of the motorcycle;
    a wheel assembly comprising:
        a first wheel mount bracket and a second wheel mount bracket secured to opposing sides of the motorcycle connector frame;
        a first wheel pivotally secured to the first wheel mount bracket and a second wheel pivotally secured to the second wheel mount bracket, wherein the first wheel and the second wheel pivot about a vertical axis; and
    a first tie rod comprising a first end secured to the rotating fork joint and a second end secured to the first wheel; and
    a second tie rod comprising a first end secured to the rotating fork joint and a second end secured to the second wheel.

2. The reverse trike attachment of claim 1, wherein the rotating fork joint rotates about a horizontal axis.

3. The reverse trike attachment of claim 2, wherein the rotating fork joint further comprises:
    a mount plate secured to the motorcycle connector frame;
    a rotating plate rotatably connected to the mount plate by a rotating shaft, wherein the rotating plate rotates about the vertical axis;
    a U-joint extending from an upper surface of the rotating plate; and a cross joint comprising a second block secured to the U-joint and rotatable about the horizontal axis and the first block secured to the second block, wherein the first and second tie rods are secured to the rotating plate.

4. The reverse trike attachment of claim 3, wherein the motorcycle connector frame comprises a pair of elongated beams substantially parallel relative to one another and a fork joint frame connecting the pair of elongated beams together, wherein the mount plate is secured to the fork joint frame.

5. The reverse trike attachment of claim 4, wherein proximal ends of the pair of elongated beams each comprise mounting brackets operable to secure to the front end of the motorcycle frame.

6. The reverse trike attachment of claim 4, wherein the rotating fork joint further comprises a bearing plate secured to the fork joint frame and the mount plate, wherein the bearing plate comprises a bearing and the rotating shaft is disposed within the bearing.

7. The reverse trike attachment of claim 3, wherein the first block and the second block are substantially perpendicular relative to one another forming a cross.

8. The reverse trike attachment of claim 1, further comprising at least one support plate mounted to the motorcycle connector frame, wherein a plurality of link bars connect the support plate to the first and second wheel mount brackets.

9. The reverse trike attachment of claim 1, further comprising a suspension assembly secured to the wheel assembly and the motorcycle connector frame.

10. The reverse trike attachment of claim 9, wherein the suspension assembly comprises:
a pair of vertical support bars extending from opposite sides of the motorcycle connector frame;
a first shock comprising a top end secured to one of the vertical support bars and a bottom end secured to the first wheel mount bracket; and
a second shock comprising a top end secured to the other of the vertical support bars and a bottom end secured to the second wheel mount bracket.

11. The reverse trike attachment of claim 1, wherein the motorcycle connector frame is operable to move towards and away from the motorcycle frame along a horizontal plane.

12. The reverse trike attachment of claim 11, further comprising:
at least one pivoting block comprising a first end and a second end, wherein the first end is pivotally mounted to the proximal end of the motorcycle connector frame, extending vertically therefrom;
a mounting bracket operable to fixedly attach to the front end of the motorcycle body; and
a pivot bar attached to the mounting bracket, wherein the second end of the at least one pivoting block is pivotally connected to the pivot bar, and
the pivoting block is prevented from of pivoting beyond about 45 degrees relative to the motorcycle connector frame in both directions.

13. A reverse trike attachment comprising:
a motorcycle connector frame comprising a proximal end operable to attach to a front end of a motorcycle frame;
a rotating fork joint secured to the motorcycle connector frame and rotatable relative to the motorcycle connector frame about a vertical axis and a horizontal axis, wherein the rotating fork joint is operable to secure to a motorcycle fork;
a wheel assembly comprising:
a first wheel mount bracket and a second wheel mount bracket secured to opposing sides of the motorcycle connector frame;
a first wheel pivotally secured to the first wheel mount bracket and a second wheel pivotally secured to the second wheel mount bracket, wherein the first wheel and the second wheel pivot about a vertical axis; and
a first tie rod comprising a first end secured to the rotating fork joint and a second end secured to the first wheel; and
a second tie rod comprising a first end secured to the rotating fork joint and a second end secured to the second wheel.

14. A reverse trike attachment comprising:
a mounting bracket operable to fixedly secure to a front end of a motorcycle frame;
a motorcycle connector frame comprising a proximal end secured to the mounting bracket so that the motorcycle connector frame is capable of moving away from and towards the mounting bracket along a horizontal plane;
a rotating fork joint secured to the motorcycle connector frame and rotatable relative to the motorcycle connector frame about a vertical axis, wherein the rotating fork joint is operable to secure to a motorcycle fork;
a wheel assembly comprising:
a first wheel mount bracket and a second wheel mount bracket secured to opposing sides of the motorcycle connector frame;
a first wheel pivotally secured to the first wheel mount bracket and a second wheel pivotally secured to the second wheel mount bracket, wherein the first wheel and the second wheel pivot about a vertical axis; and
a first tie rod comprising a first end secured to the rotating fork joint and a second end secured to the first wheel; and
a second tie rod comprising a first end secured to the rotating fork joint and a second end secured to the second wheel.

* * * * *